United States Patent [19]
Cavanagh

[11] Patent Number: 6,151,882
[45] Date of Patent: Nov. 28, 2000

[54] TURBOFAN ENGINE CONSTRUCTION

[75] Inventor: Richard A. Cavanagh, Panama City, Fla.

[73] Assignee: The United States of America as represented by the Secretary of the Navy, Washington, D.C.

[21] Appl. No.: 09/338,265

[22] Filed: Jun. 22, 1999

[51] Int. Cl.$^7$ .................................................. F02K 3/02
[52] U.S. Cl. ............................................ 60/226.1; 60/262
[58] Field of Search ............................... 60/226.1, 262, 60/39.36

[56] References Cited

U.S. PATENT DOCUMENTS

| | | | |
|---|---|---|---|
| 3,216,654 | 11/1965 | Kappus | 60/226.1 |
| 3,283,509 | 11/1966 | Nitsch | 60/226.1 |
| 3,783,618 | 1/1974 | Kawamura | 60/226.1 |
| 5,916,127 | 6/1999 | Papamoschou | 60/226.1 |

*Primary Examiner*—Charles G. Freay
*Attorney, Agent, or Firm*—Harvey A. Gilbert; Donald G. Peck

[57] ABSTRACT

A turbofan engine construction has a stator portion coupled to and centrally disposed within a rigid casing. A rotor portion is disposed between the rigid casing and the stator portion for rotation about the stator portion. A portion of fluids entering the turbofan are heated between the stator and rotor portions prior to expulsion thereof. The remainder of the fluids entering the turbofan pass unheated through the stator portion prior to expulsion. As a result, the heated fluids are expelled annularly about the unheated fluids.

16 Claims, 3 Drawing Sheets

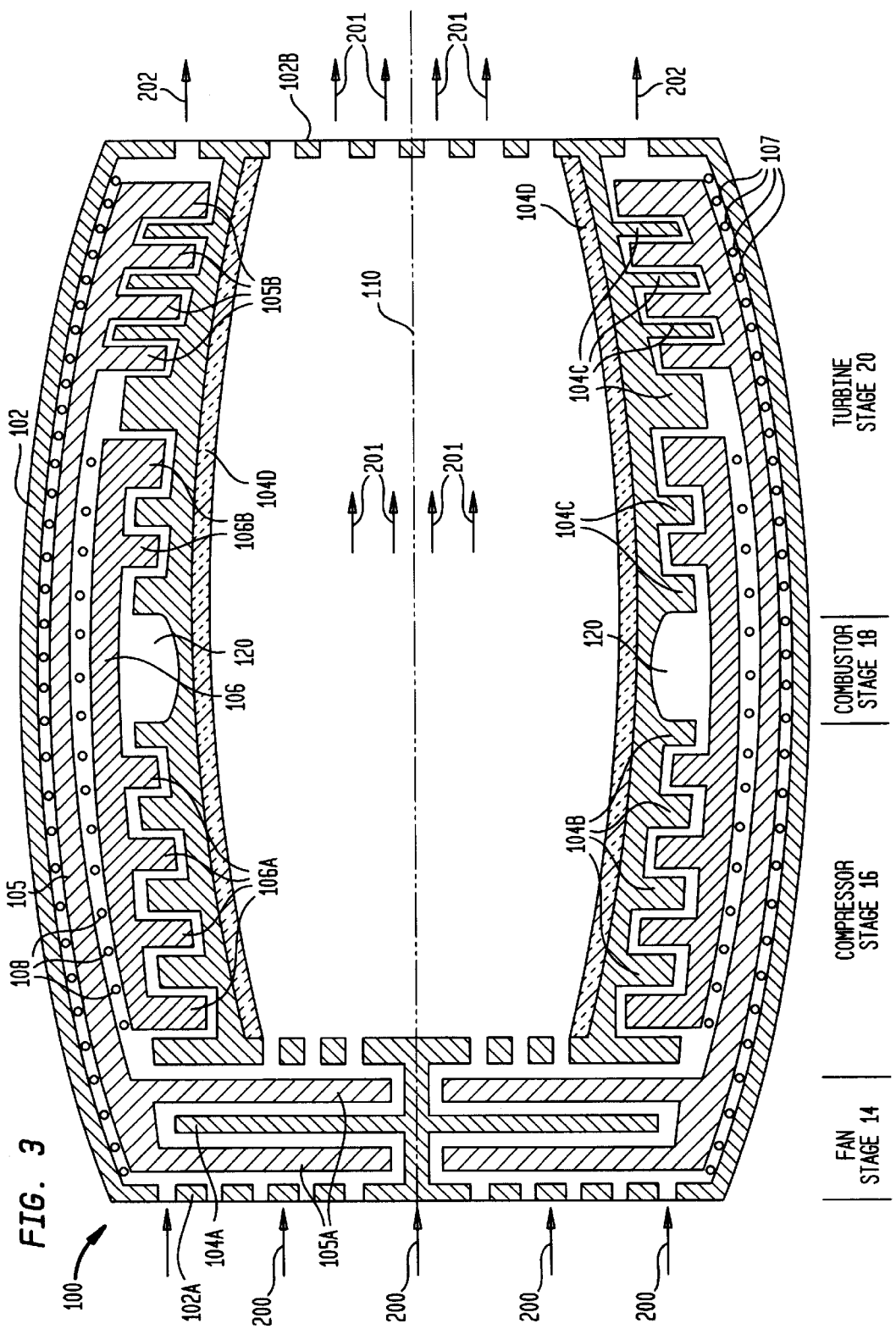

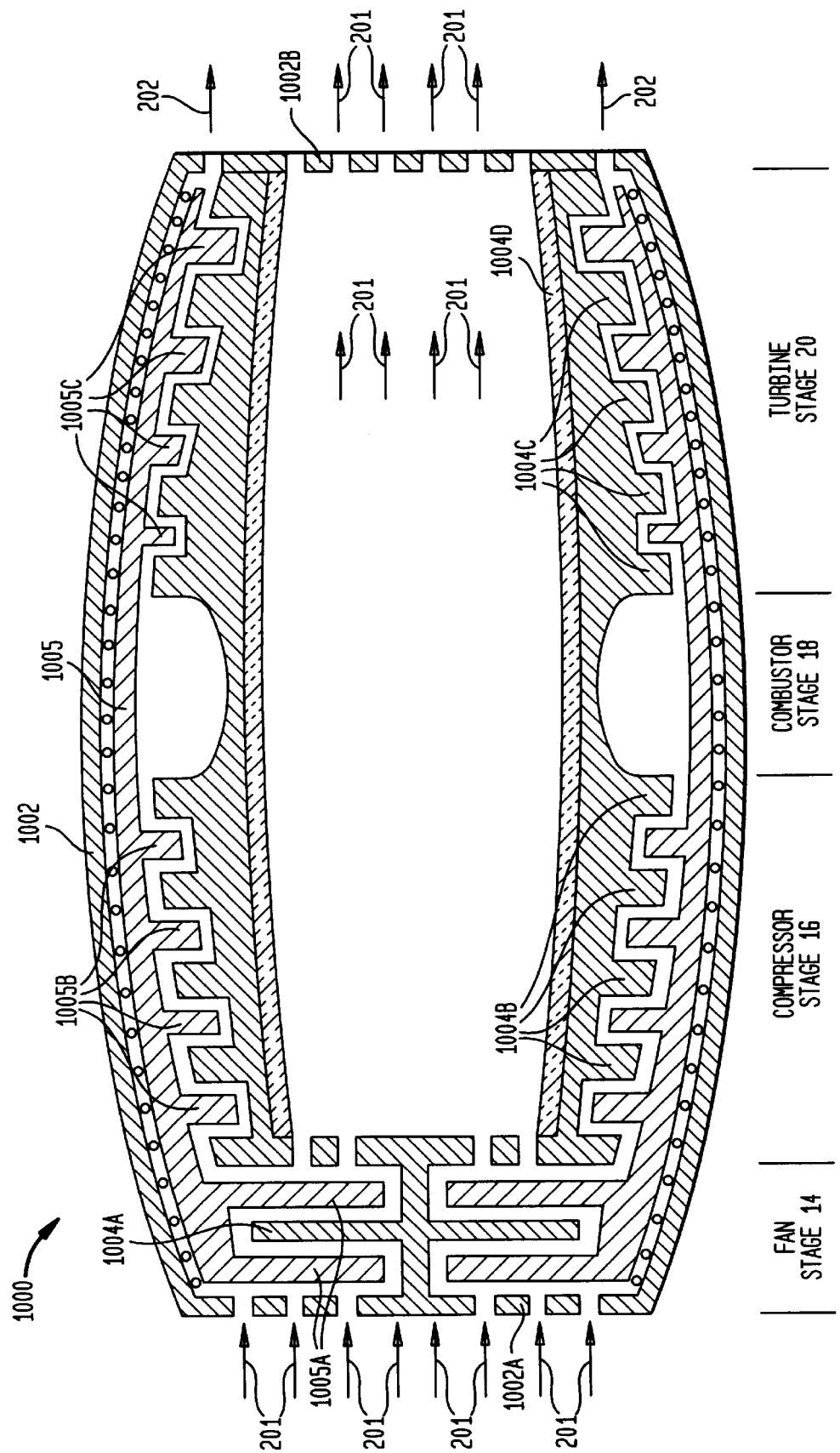

TURBOFAN ENGINE CONSTRUCTION

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to turbines, and more particularly to a turbofan engine construction for generating a high volume of cool exhaust.

BACKGROUND OF THE INVENTION

Vehicles that can hover over water (e.g., hovercrafts) and/or land (e.g., vertical take-off jets) make use of an air cushion. The larger the vehicle, the greater the volume of air that is required. In the case of hovercrafts, a gas turbine or diesel engine is typically used to drive a low speed fan which moves air into an inflatable skirt. The conventional turbine engine (e.g., turbojet or turbofan) utilizes a centrally disposed rotor rotating within a rigid (stator) casing. The exhaust from the engine is not used for inflation of the skirt because its central high-temperature core of exhaust would damage the skirt material. In the case of vertical take-off jets, operation over certain terrain (e.g., asphalt) may be restricted due to damage that could be caused by the central high-temperature core of exhaust from the downwardly-directed jets.

SUMMARY OF THE INVENTION

Accordingly it is an object of the present invention to provide a turbofan engine construction that produces a lower-temperature exhaust than is produced by conventional turbine engines.

Another object of the present invention is to provide a turbofan engine construction that produces a high-volume exhaust which can be used to supply a hovercraft's inflatable skirt or as an ambient temperature source of thrust.

Other objects and advantages of the present invention will become more obvious hereinafter in the specification and drawings.

In accordance with the present invention, a turbofan engine construction has a rigid casing with a forward end that permits the intake of fluids and an aft end that permits the expulsion of the fluids passing through the rigid casing.

A stator portion is coupled to and centrally disposed within the rigid casing. The stator portion has a stator forward end that permits the intake of fluids and a stator aft end that permits the expulsion of the fluids passing through the stator portion. A rotor portion is disposed between the rigid casing and the stator portion for rotation about the stator portion. A portion of the fluids entering the forward end are heated between the stator and rotor portions prior to expulsion at the aft end as heated fluids. The remainder of the fluids pass unheated through the stator forward end and the stator portion prior to expulsion at the stator aft end.

The heated fluids are expelled annularly about the remainder unheated portion of the fluids that are expelled from the stator aft end.

BRIEF DESCRIPTION OF THE DRAWINGS

FIG. 3 is a cross-sectional view of a two-rotor turbofan engine construction according to the present invention;

FIG. 5 is a cross-sectional view of a single rotor turbofan engine construction according to the present invention.

DETAILED DESCRIPTION OF THE INVENTION

Figure 1:
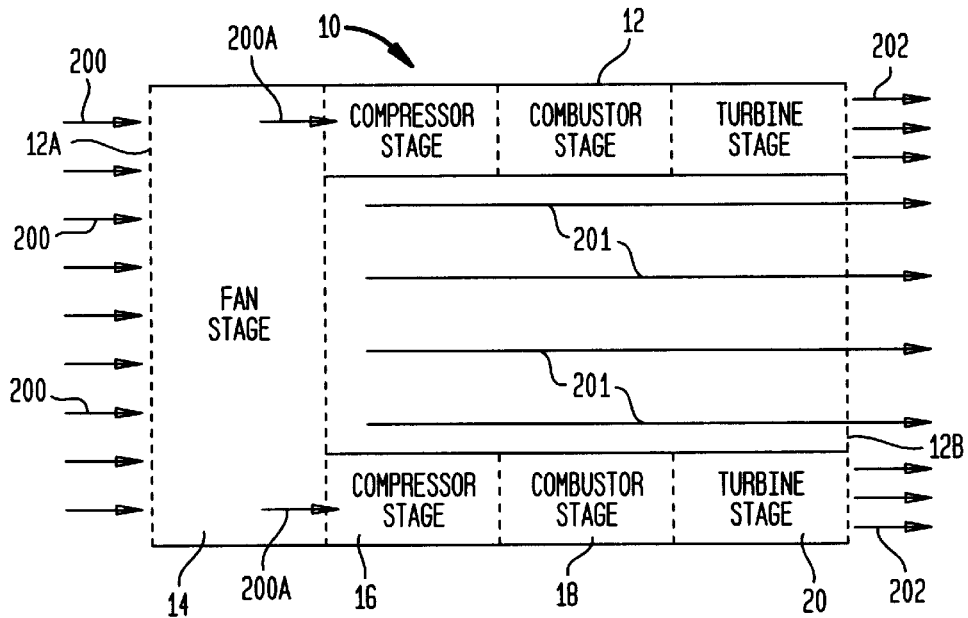
FIG. 1 is a schematic view of a turbofan engine construction according to the present invention.

Referring now to the drawings, and more particularly to FIG. 1, a turbofan engine construction according to the present invention is referenced generally by numeral 10. The term "construction" as used herein refers to the mechanical way in which the turbofan engine is constructed. That is, the details related to fuel injection/combustion are not limitations on the present invention. Accordingly, details related to fuel injection and exhaust gas production, which are well understood in the art of turbofan engines, will not be discussed herein.

Turbofan engine construction 10 includes an outer rigid casing 12 that permits the flow of fluids (e.g., air) therethrough. Accordingly, casing 12 is constructed at its forward end (referenced by dashed line 12A) to serve as a fluid intake and at its aft end (referenced by dashed-line 12B) to provide for the expulsion of fluids, i.e., exhaust.

A forward portion 14 defines a fan stage that utilizes rotors and stators to induct fluid 200 (e.g., air) into the engine at forward end 12A. An annularly-shaped stage 16 adjacent fan stage 14 defines a compressor stage which receives a portion 200A (i.e., a ring) of fluid 200 and compresses same as portion 200A moves therethrough. An annularly-shaped stage 18 adjacent compressor stage 16 defines a combustor stage where fuel is mixed with portion 200A of fluid 200 passing therethrough and the mixture is ignited. An annularly-shaped stage 20 adjacent combustor stage 18 defines a turbine stage where stators and rotors extract energy from the flow of portion 200A moving therebetween to drive fan stage 14 and compressor stage 16. Hot exhaust from the combustion process passes out of annular turbine stage as a ring of hot exhaust 202. Meanwhile, most of fluid 200 inducted into forward end 12A is sent by fan stage 14 through annularly-shaped stages 16, 18 and 20, thereby bypassing the combustion process to exit aft end 12B as unheated bypass fluid 201 (as it will be referred to hereinafter) as best seen in FIG. 2.

Figure 2:
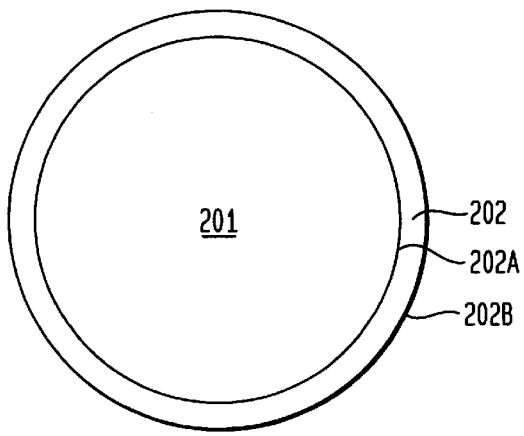
FIG. 2 is a schematic view of the exhaust configuration expelled from the aft end of the turbofan engine construction according to the present invention.

In FIG. 2, the ring of hot exhaust 202 expelled at aft end 12B is surrounded at its outer periphery by cooler ambient air and itself surrounds bypass fluid 201. Since hot exhaust 202 has its volume distributed in a ring, there is a large surface area available at its inner and outer radial surfaces 202A and 202B, respectively, for cooling as hot exhaust 202 and bypass fluid 201 mix downstream of aft end 12B.

The principles of the present invention could be implemented in a variety of embodiments. By way of example, one such embodiment is illustrated in FIG. 3 and referenced generally by numeral 100. Turbofan engine construction 100 is a two-rotor construction having an outer rigid casing 102 with a forward end 102A and aft end 102B that permits the intake and expulsion, respectively, of fluids. Construction 100 defines the four basic sequential and adjacent stages required for a turbofan as described above, to wit, fan stage 14, compressor stage 16, combustor stage 18 and turbine stage 20.

Centrally disposed and axially aligned in casing 102 is a stator 104 fixedly coupled to or integral with casing 102 at forward end 102A and aft end 102B. Stator 104 has a plurality of vanes or blades extending radially outward therefrom. More specifically, blades 104A located near forward end 102A are in fan stage 14, blades 104B are located in compressor stage 16, and blades 104C are located in turbine stage 20. Intake fluids 200 passing through forward end 102A primarily pass through stator 104 as bypass fluid 201 and partially around blades 104A, 104B and 104C to take part in the combustion process. Stator 104 can also be lined with a thermal insulation layer 104D along its inner radial surface to reduce heat transfer from the surrounding combustor and turbine stages.

Disposed about stator 104 are rotors 105 and 106 which are mounted for rotation about stator 104. Rotor 105 is rotationally mounted within casing 102 using bearings 107. Rotor 105 has a plurality of blades extending radially inward therefrom. More specifically, blades 105A are interleaved with blades 104A in fan stage 14, and blades 105B are interleaved with some of blades 104C in the aft portion of turbine stage 20. Rotor 106 is rotationally mounted between rotor 105 and stator 104 using bearings 108. Rotor 106 has a plurality of blades extending radially inward therefrom. That is, blades 106A are interleaved with blades 104B in compressor stage 16 and blades 106B are interleaved with some of blades 104C in the forward portion of turbine stage 20.

In general, rotors 105/106 with their aerodynamically-shaped blades rotate about central axis 110 of turbofan engine construction 100. The aerodynamic shape of the rotors' blades imparts axial velocity to the portion of fluid 200 moving between rotors 105/106 and stator 104. Stator 104 is attached to or integral with casing 102. The stator blades are also aerodynamically-shaped blades which are rigid and do not rotate. The purpose of the stator blades is to reduce the rotational component of velocity imparted to the portion of fluid 200 passing thereover in order to provide as much axial velocity as possible to that portion of fluid 200 passing thereover.

More specifically, an annularly-shaped ring of fluid 200 from fan stage 14 enters compressor stage 16 where rotor blades 106A and stator blades 104B progressively decrease in size so that the cross-sectional area of the flow therebetween decreases thereby compressing the flow. The compressed annularly-shaped flow then passes into combustor stage 16 where fuel is injected into an annular combustion chamber 120 defined between stator 104 and a central portion of rotor 106. The fuel mixes with the compressed fluid flow and is ignited. The resulting hot gas is under pressure from the ignition and is therefore expelled into turbine stage 20.

The forward portion of turbine stage 20 is comprised of forward ones of stator blades 104C and rotor blades 106B. The flow past rotor blades 106B causes rotor 106 to rotate thereby compressing more fluid in compressor stage 16. The flow then proceeds to the aft portion of turbine stage 20 which consists of rotor blades 105B and aft ones of stator blades 104C. This causes rotor 105 to rotate thereby allowing blades 105A to induct more of fluid 200 into forward end 102A. Stator blades 104C reduce the rotational energy of the flow thereover in order to maximize the flow's axial velocity.

Meanwhile, the majority of fluid 200 increases in velocity owing to rotation of rotor blades 105A and flow straightening brought about by stator blades 104A. This majority of fluid 200 becomes bypass fluid 201 passing through the central portion of fan stage 14 and bypassing the combustion process. Bypass fluid 201 thus exits aft end 102A essentially at ambient temperature. Note that a layer of insulation 104D can be added to the interior of stator 104 to restrict the heat of compression and combustion from affecting the temperature of bypass fluid 201.

Figure 4:
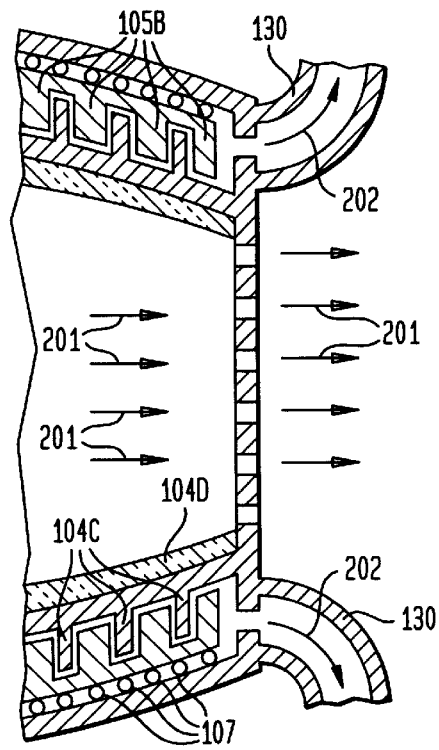
FIG. 4 is a partial cross-sectional view of the turbofan engine construction of FIG. 3 further including a hot exhaust deflector.

If hot exhaust 202 cannot be tolerated or is needed for some other purpose, hot exhaust 202 can be siphoned or deflected at aft end 102B. For example, as illustrated in FIG. 4, a deflector 130 can be coupled to aft end 102B to direct movement of hot exhaust 202 expelled at aft end 102B.

In this way, bypass fluid 201 expelled at aft end 102B can largely be used on its own.

The principles of the present invention can be extended to a variety of embodiments. By way of example, one such embodiment is illustrated in FIG. 5 where a single rotor turbofan engine construction according to the present invention is referenced by numeral 1000. Construction 1000 has a rotating cylinder 1005 with a plurality of radially inward directed blades, e.g., blades 1005A in fan stage 12, blades 1005B in compressor stage 16, and blades 1005C in turbine stage 20. A stationary cylinder 1004 is attached to or integral with a rigid casing 1002. Stationary cylinder 1004 has a plurality of radially outward directed blades, e.g., blades 1004A in fan stage 14, blades 1004B in compressor stage 16, and blades 1004C in turbine stage 20. Operation of construction 1000 is similar to that described above for the two-rotor turbofan construction and will therefore not be discussed further herein.

The advantages of the present invention are numerous. Cool exhaust fluid (air) is made available directly from this turbofan engine construction. Thus, the present invention can be used to supply air directly to hovercraft's inflatable skirts, for cabin pressurization systems in aircraft, as an air supply for pneumatically starting conventional gas turbines, or even for an air conditioning or ventilation fan in areas/applications where electric power is not available.

The present invention could also be used in vertical take-off aircraft to eliminate any concerns about the take-off terrain.

Although the invention has been described relative to specific embodiments thereof, there are numerous variations and modifications that will be readily apparent to those skilled in the art in light of the above teachings. For example, the turbofan engine construction of the present invention could be made with a large diameter and short axis to provide geometric flexibility for a variety of applications. This is possible because the combustion stage grows in size along with the diameter of the blades in the fan stage. Thus, more fuel can be burned and larger rotor blades in the fan stage can be rotated. In general, the turbofan engine construction of the present invention can be adjusted in scale from large diameter/short axis to small diameter/long axis depending on the needs of a particular application. It is therefore to be understood that, within the scope of the appended claims, the invention may be practiced other than as specifically described.

What is claimed as new and desired to be secured by letters patent of the United States is:

What is claimed is:

1. A turbofan engine construction, comprising:
   a rigid casing having a forward end that permits the intake of fluids and an aft end that permits the expulsion of said fluids passing through said rigid casing;
   a stator portion coupled to and centrally disposed within said rigid casing, said stator portion having a stator forward end that permits the intake of said fluids and a stator aft end that permits the expulsion of said fluids passing through said stator portion; and a rotor portion disposed between said rigid casing and said stator portion for rotation about said stator portion, wherein a portion of said fluids entering said forward end are heated between said stator portion and said rotor portion prior to expulsion at said aft end as heated fluids, and wherein a remainder of said fluids pass through said stator forward end and said stator portion prior to expulsion at said stator aft end, wherein said heated fluids are expelled annularly about said remainder of said fluids expelled from said stator aft end.

2. A turbofan engine construction as in claim 1 further comprising thermal insulation disposed between said stator portion and said remainder of said fluids passed through said stator portion.

3. A turbofan engine construction as in claim 1 wherein said rigid casing and said stator portion are integral with one another.

4. A turbofan engine construction as in claim 1 wherein said stator portion includes rows of stator blades disposed circumferentially thereabout and said rotor portion includes rows of rotor blades interleaved with said rows of stator blades.

5. A turbofan engine construction as in claim 1 wherein said stator portion and said rotor portion define a plurality of sequential stages to include a fan stage at said forward end, a compressor stage adjacent said fan stage, a combustor stage adjacent said compressor stage and a turbine stage adjacent said combustor stage.

6. A turbofan engine construction as in claim 5 wherein said rotor portion comprises:

a first rotor for said fan stage and an aft portion of said turbine stage; and a second rotor disposed between said first rotor and said stator portion for rotation about said stator portion independently of said first rotor, said second rotor being used for said compressor stage and a forward portion of said turbine stage, said forward portion of said turbine stage being adjacent said aft portion of said turbine stage.

7. A turbofan engine construction as in claim 1 further comprising a deflector at said aft end for directing movement of said heated fluids expelled from said aft end.

8. A turbofan engine construction, comprising:

a rigid casing having a forward end that permits the intake of fluids and an aft end that permits the expulsion of said fluids passing through said rigid casing;

a stator having stator blades extending radially outward therefrom, said stator being coupled to and axially disposed within said rigid casing, wherein said fluids can flow through said stator and around said stator blades; and at least one rotor mounted for rotation about said stator within said rigid casing and having rotor blades extending radially inward that are interleaved with said stator blades, wherein a portion of said fluids entering said forward end are heated between said stator and said at least one rotor prior to expulsion at said aft end as heated fluids, and wherein a remainder of said fluids pass through said stator prior to expulsion at said aft end, wherein said heated fluids are expelled annularly about said remainder of said fluids.

9. A turbofan engine construction as in claim 8 wherein said rigid casing and said stator are integral with one another.

10. A turbofan engine construction as in claim 8 wherein said at least one rotor comprises:

a first rotor; and a second rotor disposed between said first rotor and said stator for rotation about said stator independently of said first rotor.

11. A turbofan engine construction as in claim 8 wherein said stator and said rotor define a plurality of sequential stages to include a fan stage at said forward end, a compressor stage adjacent said fan stage, a combustor stage adjacent said compressor stage and a turbine stage adjacent said combustor stage.

12. A turbofan engine construction as in claim 11 wherein said at least one rotor comprises:

a first rotor for said fan stage and an aft portion of said turbine stage; and a second rotor disposed between said first rotor and said stator for rotation about said stator independently of said first rotor, said second rotor being used for said compressor stage and a forward portion of said turbine stage, said forward portion of said turbine stage being adjacent said aft portion of said turbine stage.

13. A turbofan engine construction as in claim 8 further comprising a deflector at said aft end for directing movement of said heated fluids expelled from said aft end.

14. A turbofan engine construction, comprising:

a rigid casing having a forward end that permits the intake of fluids and an aft end that permits the expulsion of said fluids passing through said rigid casing;

a stator having stator blades extending radially outward therefrom, said stator being coupled to and axially disposed within said rigid casing, wherein said fluids can flow through said stator and around said stator blades;

a first rotor mounted for rotation about said stator within said rigid casing, said first rotor having rotor blades extending radially inward that are interleaved with a portion of said stator blades; and a second rotor disposed between said first rotor and said stator for rotation about said stator independently of said first rotor, said second rotor having rotor blades extending radially inward that are interleaved with a remainder of said stator blades, wherein a portion of said fluids entering said forward end are heated between said stator and said second rotor prior to expulsion at said aft end as heated fluids, and wherein a remainder of said fluids pass through said stator prior to expulsion at said aft end, wherein said heated fluids are expelled annularly about said remainder of said fluids.

15. A turbofan engine construction as in claim 14 wherein said rigid casing and said stator are integral with one another.

16. A turbofan engine construction as in claim 14 further comprising a deflector at said aft end for directing movement of said heated fluids expelled from said aft end.

* * * * *